United States Patent
Totten et al.

(10) Patent No.: US 10,231,382 B2
(45) Date of Patent: Mar. 19, 2019

(54) LARGE SQUARE BALE WAGON

(71) Applicant: CNH Industrial America LLC, New Holland, PA (US)

(72) Inventors: Nathaniel Kip Totten, Lititz, PA (US); Jeffrey B. Fay, II, Wilmington, DE (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/079,223

(22) Filed: Mar. 24, 2016

(65) Prior Publication Data

US 2017/0273245 A1    Sep. 28, 2017

(51) Int. Cl.
| | |
|---|---|
| *A01D 85/00* | (2006.01) |
| *B65G 57/00* | (2006.01) |
| *B65G 43/08* | (2006.01) |
| *A01F 15/08* | (2006.01) |

(52) U.S. Cl.
CPC ............ *A01D 85/005* (2013.01); *A01F 15/08* (2013.01); *B65G 43/08* (2013.01); *B65G 57/00* (2013.01); *A01D 2085/007* (2013.01)

(58) Field of Classification Search
CPC ...... B65G 43/08; B65G 57/00; A01D 85/005; A01D 2085/007; A01F 15/08
USPC ....................................................... 414/111
See application file for complete search history.

(56) References Cited

U.S. PATENT DOCUMENTS

| | | | |
|---|---|---|---|
| 2,848,127 A | 8/1958 | Grey | |
| 3,945,507 A * | 3/1976 | Olsen | A01D 90/08 414/789.4 |
| 4,091,943 A * | 5/1978 | Bay-Schmith | A01D 90/08 414/555 |
| 4,203,695 A * | 5/1980 | Wynn | A01D 90/08 414/789.4 |
| 4,426,183 A | 1/1984 | Butler | |
| 4,428,706 A * | 1/1984 | Butler | A01D 90/083 414/24.5 |
| 4,844,675 A * | 7/1989 | Strosser | A01D 85/005 414/111 |
| 4,952,111 A * | 8/1990 | Callahan | A01D 90/083 414/111 |
| 5,547,334 A * | 8/1996 | Baril | A01D 90/08 414/789.7 |
| 5,899,652 A * | 5/1999 | Graham | A01D 90/083 414/24.5 |
| 6,997,663 B2 * | 2/2006 | Siebenga | A01D 85/005 414/111 |
| 7,347,659 B2 * | 3/2008 | Maclay | A01D 87/122 414/24.5 |
| 7,419,345 B2 * | 9/2008 | Priepke | A01D 85/005 414/24.5 |
| 8,112,202 B2 * | 2/2012 | Fackler | A01D 90/08 56/474 |

(Continued)

*Primary Examiner* — Rakesh Kumar
(74) *Attorney, Agent, or Firm* — Patrick M. Sheldrake; Peter K. Zacharias

(57) ABSTRACT

A method of grasping a bale of crop material and placing the bale in a bale wagon, the method comprising the steps of sensing, grasping and evaluating. The sensing step includes sensing a presence of a bale between grasping arms of a bale grasping mechanism. The grasping step includes grasping the bale with the grasping arms. The evaluating step includes evaluating a size of the bale that has been grasped.

10 Claims, 9 Drawing Sheets

(56) References Cited

U.S. PATENT DOCUMENTS

| | | | | |
|---|---|---|---|---|
| 9,296,597 | B1 * | 3/2016 | Cannon | B66F 9/183 |
| 9,370,140 | B2 * | 6/2016 | Sudbrack | B60P 1/48 |
| 2005/0220571 | A1 * | 10/2005 | Ackerman | A01D 90/08 414/24.5 |
| 2005/0226709 | A1 * | 10/2005 | Koster | A01D 90/08 414/501 |
| 2005/0288841 | A1 * | 12/2005 | Fackler | A01D 85/005 701/50 |
| 2006/0175445 | A1 * | 8/2006 | Hoovestol | A01D 90/08 241/101.74 |
| 2008/0267740 | A1 * | 10/2008 | Anderson | A01D 85/005 414/111 |
| 2010/0299029 | A1 * | 11/2010 | Fackler | A01D 90/08 701/50 |
| 2017/0273246 | A1 * | 9/2017 | Fay, II | A01D 90/02 |

* cited by examiner

LARGE SQUARE BALE WAGON

BACKGROUND OF THE INVENTION

1. Field of the Invention

The present invention relates generally to self-propelled agricultural bale wagons and, more particularly to bale wagons of the type adapted to pick up crop material bales in the field and automatically form stacks of these bales utilizing a variety of stacking patterns to form a stable, interlocked stack of bales.

2. Description of the Related Art

A bale wagon by G. E. Grey is described in U.S. Pat. No. 2,848,127, and is principally adapted for stacking bales and is basically comprised of three tandomly arranged cooperating tables. In operation, the basic Grey wagon functions to pick up bales, form them into a composite stack, and subsequently discharge the entire stack in a storage area.

Present day practices in crop harvesting involve the formation of bales of crop material such as hay or other crops into stacks for storage by using an automatic bale wagon. One type of bale wagon that has achieved widespread commercial acceptance is the automatic bale wagon which uses three tables as illustrated and described in U.S. Pat. No. 4,203,695 issued to Edward J. Wynn et al.

Such bale wagons include a first table which receives bales from a bale loader or pick up device mounted on the bale wagon. The first table accumulates a predetermined number of bales with the bales being arranged in a row in a pattern determined by a computer on board the bale wagon. A second table receives the rows of bales from the first table and accumulates several such rows. This group of rows is commonly referred to as a "tier". A third table or load bed then receives the tiers from the second table and accumulates these tiers to form a "stack" on the load bed.

Once the stack has been accumulated on the load bed, it may be unloaded by pivoting the load bed 90 degrees and depositing the stack on the ground or other surface so that the first tier of bales which was accumulated on the second table is now the lowermost tier of the stack on the ground surface. In order to enhance the stability of the stack, it is desirable to vary the arrangement of the tiers within the stack, and the on-board computer is used to control tier pattern selection and formation on the wagon and the formation of bales into a predetermined sequence of tier patterns to form a block for stacking.

It would be very beneficial to have a pattern selection process that does not add another complex control, but reduces the time, effort, and frustration required to choose a desired pattern.

Current bale collecting system on self-propelled bale wagons require that the operator input the bale size being collected into the controller in order for the control system to determine the stack pattern to be used. This is fine provided the operator does not inadvertently select the incorrect bale size. If he does select the incorrect size, for example, selecting three foot bales when he is actually collecting four foot bales, the prior art systems cannot sense that the incorrect stack pattern is being used and will load three four foot bales when only two should be loaded. This can result in damage to the clamp mechanism when the third bale strikes the second bale on the second table, or a bale can become caught between the front of the second table and the clamp mechanism or cab. While neither of these scenarios present a danger to the operator, the time required to remove a very large and heavy bale from the bale wagon takes additional time and probably requires that the bale be cut, which is a total loss. Further, current systems cannot detect when a bale has broken during the clamping or lifting motions. In these cases, the operator must manually intervene to reset the system to inform the controller that a bale was not deposited on the second table. Likewise, if a 3×4 bale is sitting in its side in the field, current control systems will deposit the bale on its side on the second table, which will result in an uneven, unstable stack.

What is needed in the art is a bale wagon system that eliminates the mistakes of the prior art stacking systems and stacks bales in an efficient cost saving manner.

SUMMARY OF THE INVENTION

The present invention provides an inventive control system and method for a loading clamp of a large square bale wagon.

The invention in one form is directed to a method of grasping a bale of crop material and placing the bale in a bale wagon, the method comprising the steps of sensing, grasping and evaluating. The sensing step includes sensing a presence of a bale between grasping arms of a bale grasping mechanism. The grasping step includes grasping the bale with the grasping arms. The evaluating step includes evaluating a size of the bale that has been grasped. The invention in another form is directed to an agricultural bale wagon including a chassis, an articulating mechanism coupled to the chassis, a bale grasping mechanism having a set of grasping arms, and a controller. The grasping mechanism is coupled to the articulating mechanism. The controller is configured to control the grasping arms and the articulating mechanism by carrying out the steps of sensing, grasping and evaluating. The sensing step includes sensing a presence of a bale between grasping arms of a bale grasping mechanism. The grasping step includes grasping the bale with the grasping arms. The evaluating step includes evaluating a size of the bale that has been grasped.

An advantage of the present invention is that the bale size is evaluated as it is picked up.

Another advantage is that the present invention is that the stack patterns are preserved since the size of the bale is known.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
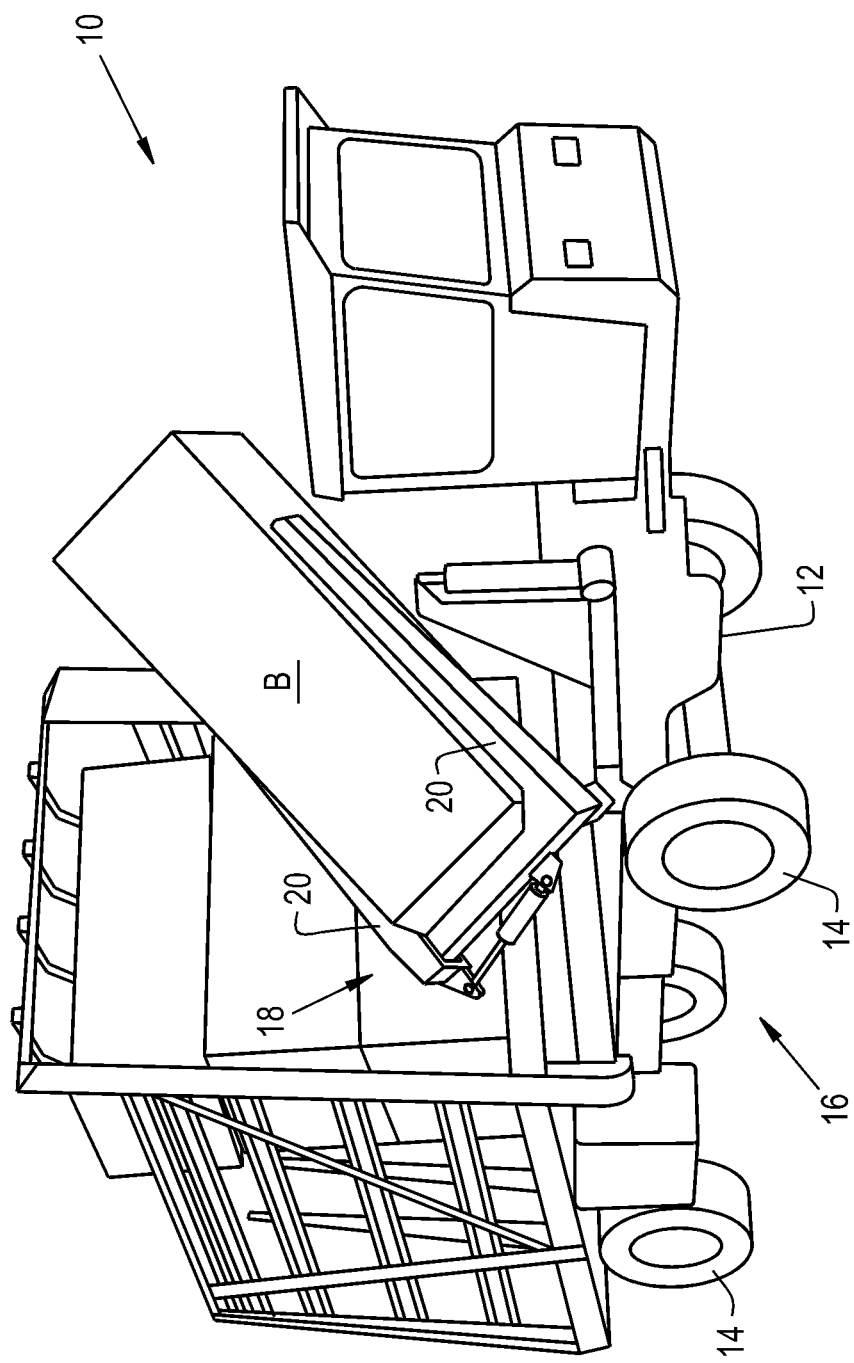
FIG. 1 is a side perspective view of an agricultural bale wagon that uses an embodiment of a system for the detection of the sizes of the bales it picks up of the present invention.
Figure 2:
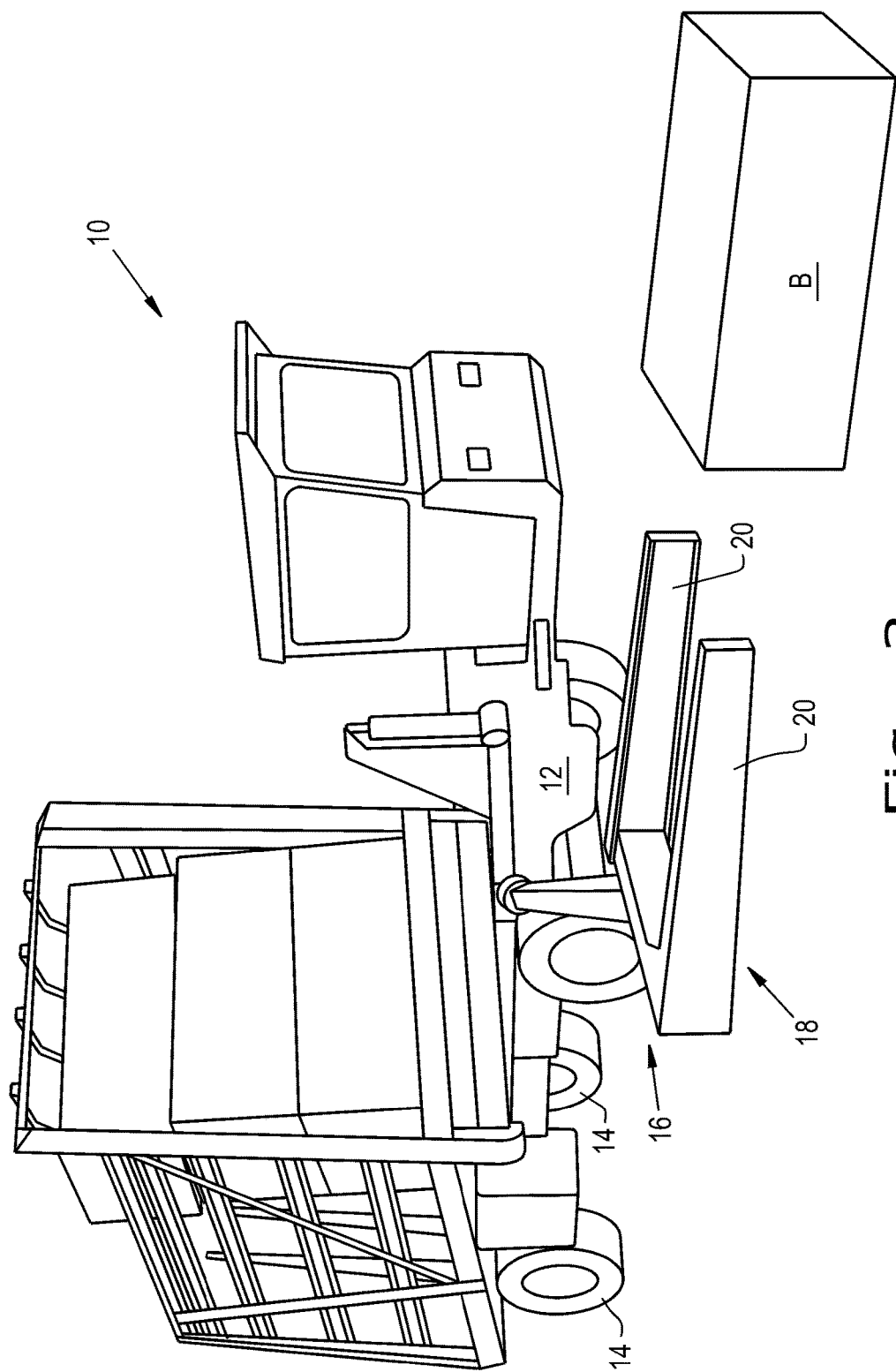
FIG. 2 is another view of the bale wagon of FIG. 1 before it encounters a bale.

Referring now to the drawings, and more particularly to FIGS. 1-7, there is shown a bale wagon 10 having a chassis 12, wheels 14, an articulating mechanism 16, and a grasping mechanism 18. Wheels 14 are coupled to chassis 12 and provide support to chassis 12. Articulating mechanism 16 is coupled to chassis 12 and to grasping mechanism 18, it provides the lifting, orientating and stacking functions of a bale that is grasped by grasping mechanism 18, to position bales on bale wagon 10.

Grasping mechanism 18 includes grasping arms 20, a clamp actuator 22, a bumper 24, springs 26, a sliding member 28, a bumper sensor 30, a transport sensor 32, a three foot sensor 34, and a four foot sensor 36. Grasping arms 20 are arranged to engage and hold a bale B in a squeezing, grasping or clamping fashion. Actuator 22 moves grasping arms 30 by causing sliding member 28 to move. Bumper 24 is positioned between arms 20 and is configured to move as it contacts a bale. Springs 26 bias bumper 24 outward and they are compressed when a bale contacts bumper 24. The movement of bumper 24 is detected by the activation of bumper sensor 30, thereby indicating the presence of a bale between arms 20. Sensors 32, 34 and 36 are mounted to plate or channel 42, with sliding member 28 sliding along triggering sensors 32, 34 and 36 dependent upon whether slide 28 is proximate to sensors 32, 34 and 36, this triggering then providing feedback to detect the position of sliding member 28 and thereby whether a bale has been dropped, or if the bale is three feet wide or four feet wide.

Figure 3:
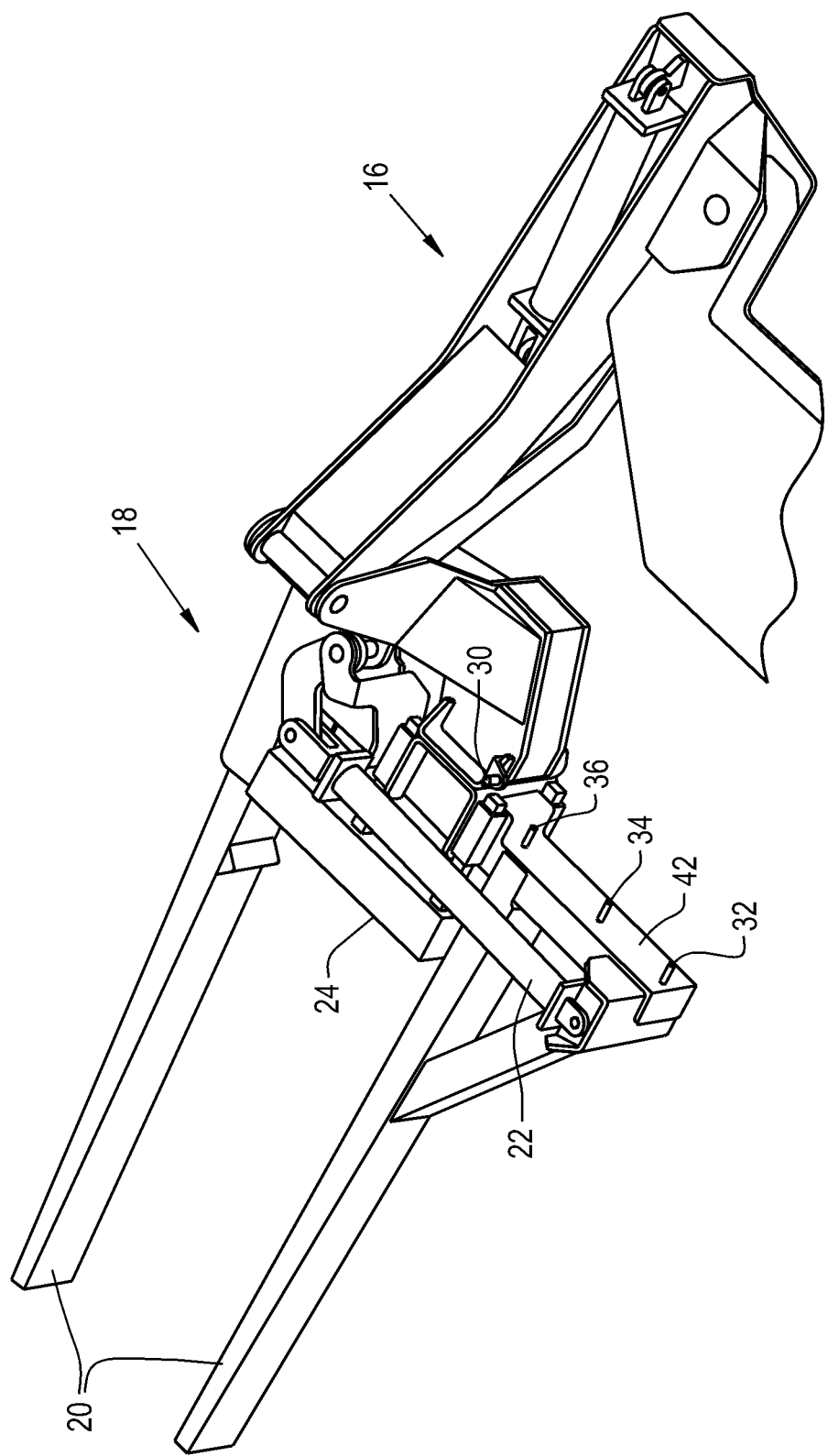
FIG. 3 is a perspective view of the grasping mechanism of the present invention used with the bale wagons of FIGS. 1 and 2.
Figure 4:
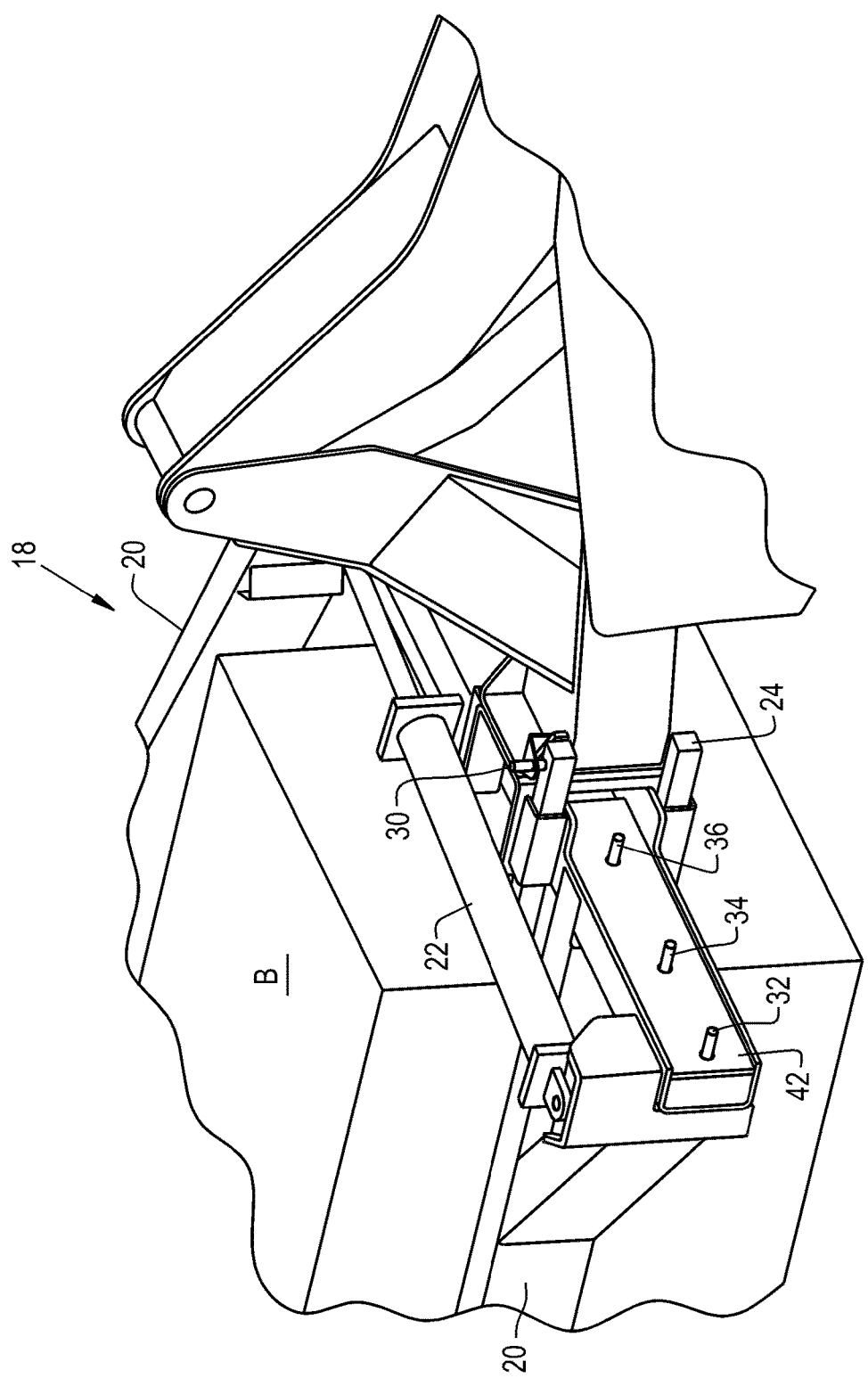
FIG. 4 is a closer perspective view of the grasping mechanism of FIG. 3.
Figure 5:
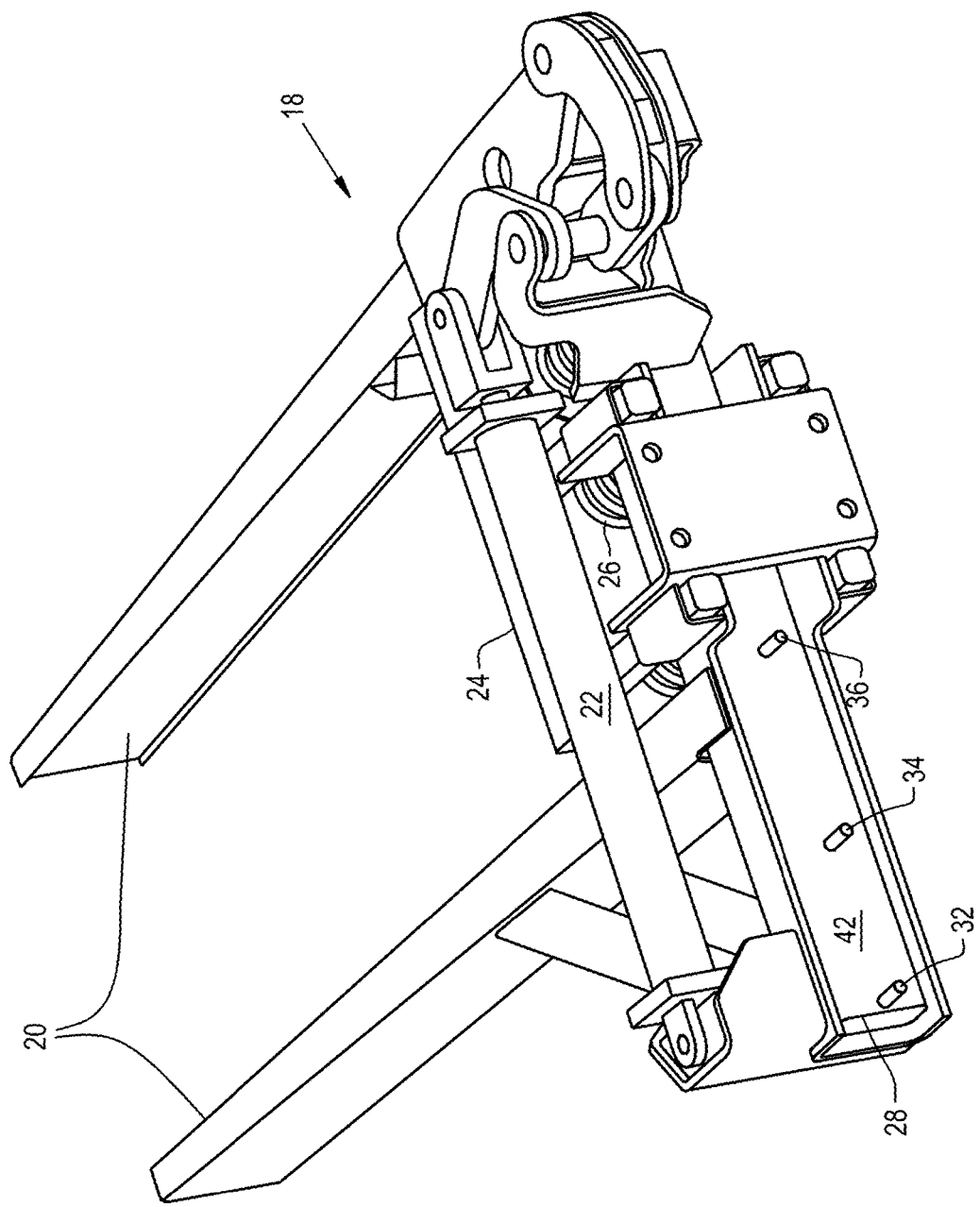
FIG. 5 is another perspective view of the grasping mechanism of FIGS. 3 and 4.
Figure 6:
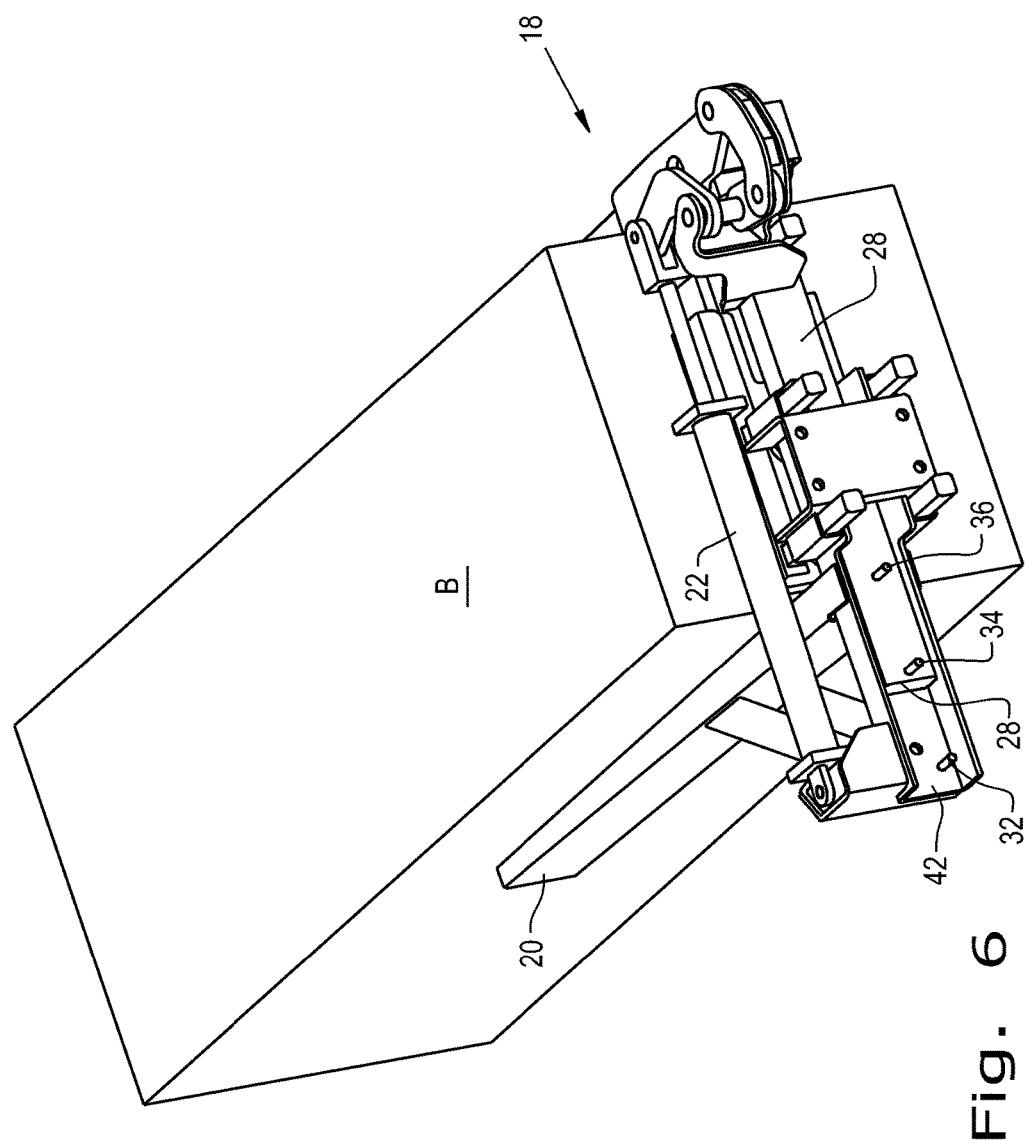
FIG. 6 is a view of the grasping mechanism of FIGS. 3-5 grasping a 3 foot bale.
Figure 7:
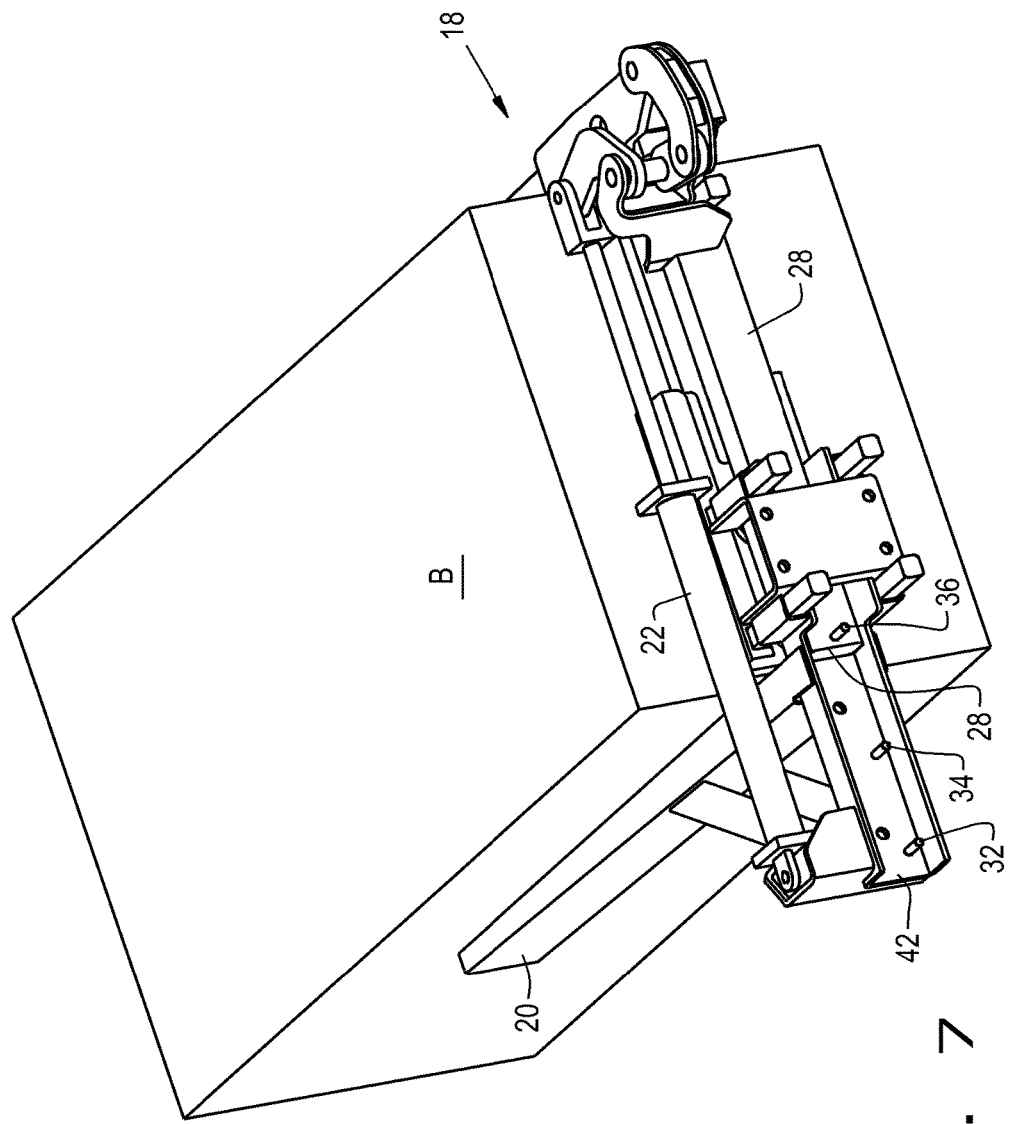
FIG. 7 is a view of the grasping mechanism of FIGS. 3-6 grasping a 4 foot bale.

In looking at FIGS. 3 and 4, it can be seen that with no bale in FIG. 3 bumper 24 is biased outward, then bumper 24 is pushed back with a portion of bumper 24 extending back as can be seen in FIG. 4. This triggers sensor 30 to indicate the presence of bale B being between arms 20. Sequentially looking at FIGS. 5-7 sensors 32, 34 and 36, which are mounted to plate 42, are shown as though looking through slide 28, with the left portion of slide 28 shown in some of the Figs. The position of slide 28 relative to sensors 34 and 36 determine the width of bale B. For example in FIG. 4, bale B has contacted bumper 24 and slide 28 is to the right not covering any of sensors 32, 34 and 36, with arms 20 fully open. In FIG. 5 arms 20 are positioned in a transport mode and slide 28 completely encompasses sensors 32, 34, 36. In FIG. 6 sensors 34 and 36 are beneath slide 28 causing them to be triggered, and sensor 32 is not triggered indicating that a three foot bale is present. In FIG. 7 sensor 36 is triggered by the proximity of slide 28 with sensors 32 and 34 being not triggered to then indicate that a four foot bale B being present.

Figure 8:
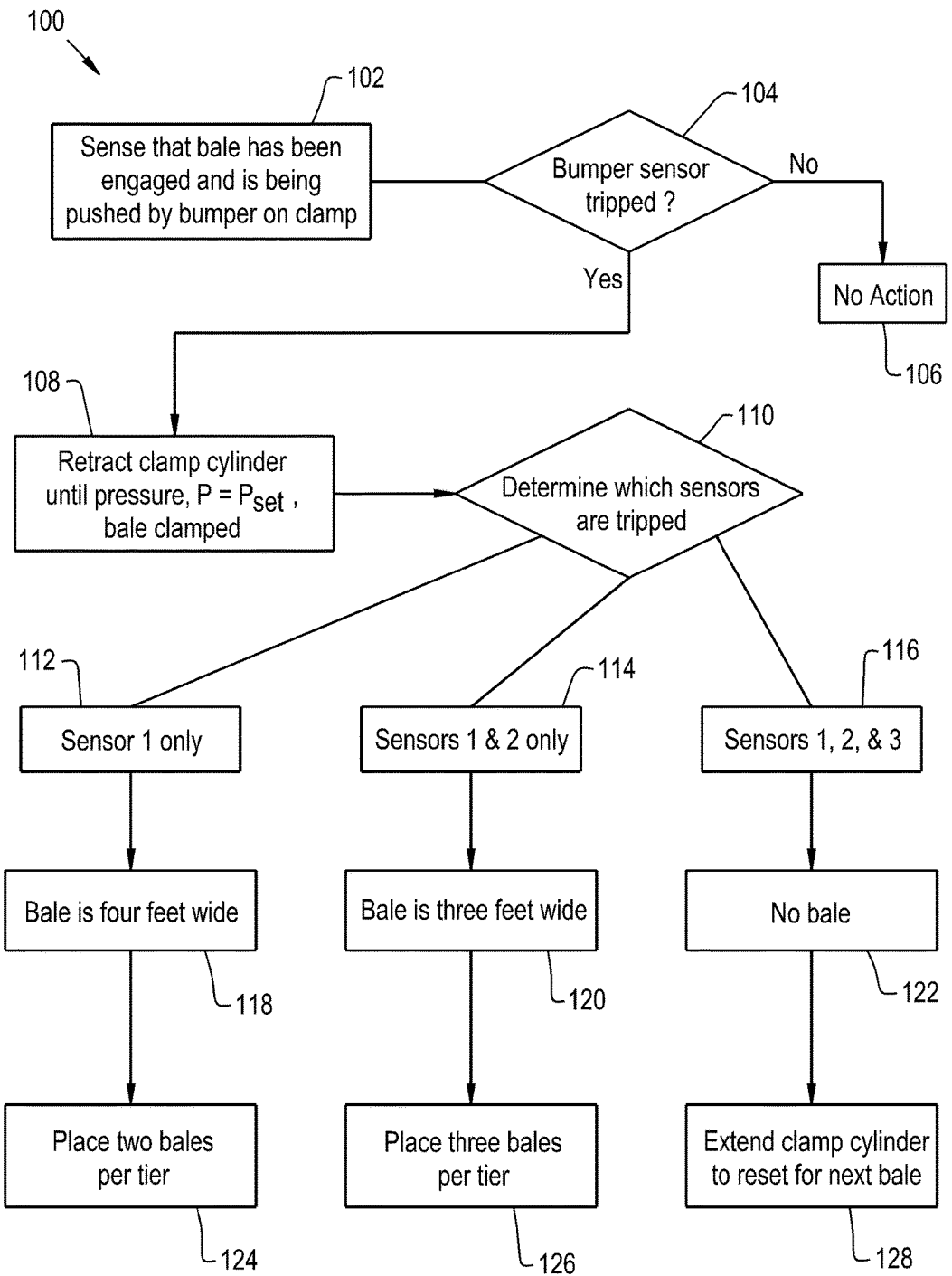
FIG. 8 is a flowchart depicting the logic of an embodiment of the grasping system of the present invention.
Figure 9:
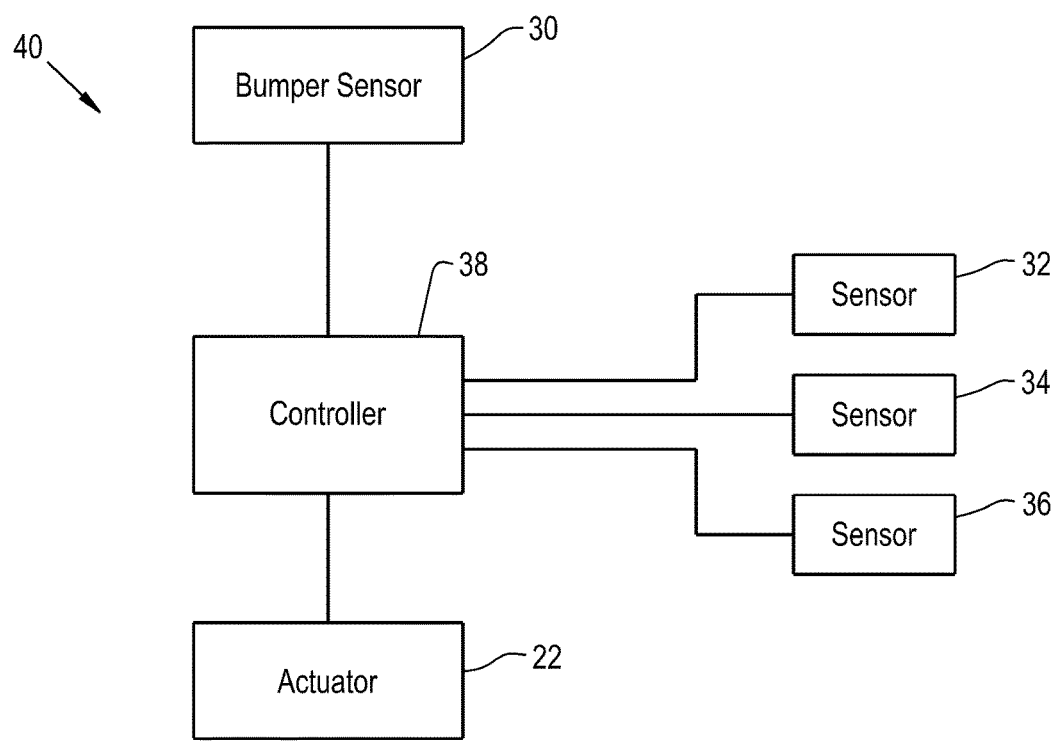
FIG. 9 is a schematical block diagram of the grasping system that carries out the method of FIG. 8.

Now additionally referring to FIGS. 8 and 9, there is shown a method 100 to control grasping mechanism 18 and a structure of the system to carry out method 100. Proposed here is an algorithm 100 to use feedback from the bale clamp position in order to determine the size of a bale and thus determine the tier stack pattern. Method 100 also provides automatic clamp initiation when bale B contacts bumper 24 thereby activating sensor 30.

The system executes method 100 as follows: 1. The control system 40 senses that a bale B has been engaged by the bumper 24 of the clamp 18 (see step 102). This is accomplished by the bumper 24 being pushed back, with respect to the clamp frame, and tripping a frame mounted sensor 30 (see step 104). If no bale is sensed method 100 proceeds to step 106. 2. Upon sensing bale B, the control system 40 by way of controller 38 retracts clamp cylinder 22, which squeezes bale B (this can either be accomplished using a translational/rotational system or a purely translational system). 3. When the pressure in the cylinder reaches a predetermined set point (see step 108), as a pressure adequate to clamp and hold bale B, the system 40 determines the width of bale B based on the position of the translational element 28 of the clamp. 4. If only the four foot (first) sensor 36 is tripped (see steps 110 and 112), the bale is four feet wide (step 118), then the system 40 determines that two bales are to be placed per tier (step 124). If the first sensor 32 and three foot sensor 34 (second sensor) are tripped (see steps 110 and 114), the system 40 determines that bale B is three feet wide (step 120) and that three bales are to be placed per tier (step 126). If the four foot sensor 36, three foot sensor 34, and transport sensor 32 are all tripped (see steps 110 and 116), the clamp 18 has retracted to the transport position and there is not a bale in clamp 18 (either a false reading on bumper sensor 30 or a dropped/broken bale has occurred). In this case, the clamp cylinder 22 is extended and the system 40 re-sets to clamp another bale, no bales are added to a tier. The logic controlling tier formation, i.e. bale count, will be used after the bale size has determined the stack pattern by the present invention.

It is also contemplated that the method of sensing the size of the bale can be accomplished by different means. For example, the method described above can be substituted with a cylinder having internal extension sensing rather than discrete sensors. The clamp cylinder 22 retraction rate can also be used for sensing that a bale has been squeezed. That is, if the cylinder 22 has been retracted and has not tripped another sensor on the translational element 28 of the clamp for x-amount of time, it can be assumed that the bale is fully gripped and is ready to be lifted. The bumper sensor 30 can be replaced with an alternate form of sensing, such as a slave cylinder which is extended when the bumper 24 is pushed back.

As depicted, there are four sensors 30, 32, 34, 36 located on the bale clamp 18: one to initiate the clamp procedure, and three to determine bale size and/or presence. The logic works as follows for consistently sized bales: 1. The clamp squeezes the first bale B and determines the stack pattern based on the bale size: three bales per tier for three foot wide bales and two bales per tier for four foot wide bales. 2. Assuming the clamp 18 is always encountering the same sized bales, the loading and stacking system works the same way as current systems. The logic of the present invention works as follows for inconsistent bale sizes: 1. The clamp 18 squeezes the first bale to be loaded and determines its size. If it is a three foot bale, then system 40 will stack three per tier. If the bale is a four foot bale, then system 40 will stack two per tier. 2. The next bale is squeezed and the size is determined. If it is a three foot bale, it is placed on the rack in front of the first bale, assuming the first was three feet. If it is a four foot bale and the first was three feet, the arm 16 stops the lift cycle and alerts the operator that the bale does not match the load pattern being used. The operator is then prompted to manually disengage and drop the bale. The operator can then continue collecting bales provided they are of the appropriate size. This would function likewise if the first bale was a four foot bale and the second a three foot bale. 3. Assuming consistently sized bales are being collected thereafter, the operation of the second table and load rack of bale wagon 10 are the same as current systems and will not be discussed here in detail.

The clamp function works as follows for broken or missed bales: 1. The first bale is collected as before, determining the stack pattern. 2. If at any point during loading the bump sensor 30 is tripped, initiating the clamp sequence, and all three sensors 36, 34, 32 are tripped at any point during the clamping or lifting cycle due to a broken or dropped bale, the control system 40 will alert the operator that a bale has been broken or dropped. Control system 40 will then automatically reset to pick up another bale in place of the broken/dropped bale. Current systems do not have this functionality and would continue collecting bales as though none had been lost and would create a stack missing a bale if the operator does not intervene. Advantageously the present invention also extends to the picking up of 3×4 bales and encountering a bale on its side, which if collected, would produce an uneven, unstable stack. System 40 will reject that bale, as it will sense that it is too narrow.

Advantageously, with the present invention an operator can enter a field and not have to consider bale size when collecting bales, rather, the operator can simply begin picking up bales and the control system 40 will create the stack pattern based on the bale sizes that are sensed.

This system will eliminate the very likely scenario where the operator has been collecting bales of one size, and goes to another field to collect bales of another size but forgets to set the controller to the new size, as is required with prior art systems.

The present invention can work with any clamp mechanism that can accommodate differing bale widths without requiring the operator to manually adjust the bale clamp in order to lift bales of a differing size.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural bale wagon, comprising:
a chassis;
an articulating mechanism coupled to the chassis;
a bale grasping mechanism having a set of grasping arms, the grasping mechanism being coupled to the articulating mechanism;
a hydraulic actuator coupled to the grasping arms so as to effect movement of the grasping arms; and
a controller configured to control the grasping arms and the articulating mechanism by carrying out the steps of:
sensing a presence of a bale between the grasping arms of the bale grasping mechanism;
grasping the bale with the grasping arms; and
evaluating a size of the bale that has been grasped once a pressure of a fluid in the hydraulic actuator exceeds a predetermined value.

2. The agricultural bale wagon of claim 1, wherein the controller further carries out the step of determining a bale stack pattern dependent upon the size of the bale as determined in the evaluating step.

3. The agricultural bale wagon of claim 1, wherein the controller further carries out the step of determining whether the bale size will fit a current stack pattern in the bale wagon.

4. The agricultural bale wagon of claim 3, wherein the controller further carries out the step of disengaging the bale dependent upon the bale being a wrong size to fit the current stack pattern.

5. The agricultural bale wagon of claim 3, wherein the controller further carries out the step of loading the bale into the current stack pattern.

6. The agricultural bale wagon of claim 3, wherein the evaluating step further determines whether the bale has evaded the grasping arms in the grasping step or has disintegrated.

7. The agricultural bale wagon of claim 6, wherein if the bale has evaded the grasping arms or disintegrated then wherein the controller further carries out the step of not reserving a place in the current stack pattern.

8. The agricultural bale wagon of claim 1, further comprising at least two sensors, the evaluating step using the at least two sensors to detect two different size bales.

9. The agricultural bale wagon of claim 8, further comprising a third sensor, the controller further carries out the evaluating step using the third sensor to determine that no bale is present between the grasping arms.

10. The agricultural bale wagon of claim 1, further comprising:
a biased bumper coupled to the grasping mechanism; and
a sensor associated with the bumper, the controller carrying out the sensing step using the sensor that is triggered by the bale pushing against the biased bumper.

* * * * *